(12) United States Patent
Denkmeier et al.

(10) Patent No.: US 7,784,317 B2
(45) Date of Patent: Aug. 31, 2010

(54) SAFETY SYSTEM FOR A BENDING PRESS AND A SLATTED TOOL

(75) Inventors: Thomas Denkmeier, Traun (AT); Gerhard Sperrer, Oberschlierbach (AT)

(73) Assignee: Trumpf Maschinen Austria GmbH & Co. Kg., Pashing (AT)

( * ) Notice: Subject to any disclaimer, the term of this patent is extended or adjusted under 35 U.S.C. 154(b) by 1090 days.

(21) Appl. No.: 11/428,927

(22) Filed: Jul. 6, 2006

(65) Prior Publication Data

US 2007/0033982 A1 Feb. 15, 2007

(30) Foreign Application Priority Data

Jul. 6, 2005 (AT) .............................. A 1138/2005

(51) Int. Cl.
*B21D 55/00* (2006.01)
*F16P 3/14* (2006.01)

(52) U.S. Cl. ........................... 72/21.3; 72/14.3; 72/21.1; 72/28.1; 72/389.3; 250/221; 250/222.1; 250/559.12; 192/130; 192/134; 100/348

(58) Field of Classification Search ................. 250/221, 250/222.1, 559.12, 559.13; 72/14.3, 21.1, 72/21.3, 28.1, 389.3, 389.6; 192/130, 134; 100/348

See application file for complete search history.

(56) References Cited

U.S. PATENT DOCUMENTS 4,772,801 A * 9/1988 Fornerod et al. ........... 72/389.3

| 5,579,884 | A | * | 12/1996 | Appleyard et al. | .......... | 192/130 |
| 6,389,860 | B1 | * | 5/2002 | Stalzer | .......... | 72/1 |
| 6,919,554 | B2 | * | 7/2005 | Braune et al. | .......... | 72/21.3 |
| 6,919,555 | B2 | * | 7/2005 | Fiessler | .......... | 72/21.3 |
| 7,080,534 | B2 | * | 7/2006 | Schneiderheinze | .......... | 72/21.3 |
| 7,448,242 | B2 | * | 11/2008 | Dieterle et al. | .......... | 72/21.1 |
| 7,454,935 | B2 | * | 11/2008 | Braune et al. | .......... | 72/21.3 |
| 2002/0104958 | A1 | * | 8/2002 | Fiessler | .......... | 250/221 |

FOREIGN PATENT DOCUMENTS

DE 3418 108 11/1985
WO WO 01/56720 8/2001

OTHER PUBLICATIONS

A first Official Action issued by the Austrian Patent Office.

* cited by examiner

*Primary Examiner*—David B Jones
(74) *Attorney, Agent, or Firm*—Alston & Bird LLP

(57) ABSTRACT

The invention describes a safety system (22) for a production unit (1) for bending a sheet metal part (3), in particular for a bending press (2), with a stationary bench beam (13) and a bending tool (4, 5) for a displaceable press beam (13), and with a light beam transmitter and receiver system (23) monitoring an operating region to prevent trapping of a foreign body. The bending tool (5) disposed in the press beam (13) is provided in the form of a slat pack (34) comprising at least one reference slat (35) and at least one tool slat (33) which can be displaced relative to it, which are provided with recesses (60) traversing them in the direction of a thickness (32). When oriented in alignment, these form a beam passage (65) for a light beam (9), in particular a laser light beam, extending parallel with an end face (8) of the press beam (13). An embodiment of the bending tool is possible in the form of a skeleton tool.

22 Claims, 6 Drawing Sheets

SAFETY SYSTEM FOR A BENDING PRESS AND A SLATTED TOOL

BACKGROUND OF THE INVENTION

1. Field of the Invention

The invention relates to a safety system for bending a sheet metal part, in particular for a bending press, with a stationary bench beam and a press beam which can be linearly displaced in a guide arrangement relative to the bench beam by means of a drive system, and with bending tools in tool holders disposed at oppositely lying end faces of the bench beam and of the press beam forming an operation area between mutually facing forming regions, and having a light beam transmitter and receiver system monitoring the operating region to prevent trapping of a foreign body. The invention also relates to a bending tool for such a bending press.

2. Prior Art

A safety system for a production machine, e.g. a bending press, is known from patent specification WO 01/56720 A1. It comprises a beam transmitter and a beam receiver. They are mounted by a retaining device on a press beam which is displaceable relative to a stationary press beam by means of a drive arrangement. The beam curtain extends across the entire length of the press beam directly in front of the bending tools facing an operator and a state in which the safety of the operator is at risk due to careless actions based on the motion sequence of the displaceable press beam is therefore detected when the light beam is interrupted and in such a situation, an emergency stop function is triggered by the control system of the production machine and the displaceable press beam moved in reverse to an open position to eliminate the risk.

OBJECTIVES AND ADVANTAGES OF THE INVENTION

The objective of the invention is to propose a safety system for a production unit for bending a sheet metal part, by means of which the working area directly between the bending tools which can be displaced relative to one another to effect a bending operation is monitored, and bending tools with a low weight are obtained.

This objective is achieved on the basis of the characterizing features of the invention described herein, which include a bending tool for the press beam in the form of a slat pack comprising at least one reference slat and at least one tool slat. There are recesses in the reference and tool slats, and the recesses collectively define a beam passage through which a light beam from a light beam transmitter passes when the recesses are aligned. The tool slat is displaceable relative to the reference slat, such that when the tool slat is displaced the recesses are not aligned and thus the light beam is blocked. The surprising advantage resides in the fact that, because the position of the top tool unit or tool slats are detected, obstruction of the working area in front of the bending tools is avoided due to several beams in front of the tools, as in the known arrangement, which also reduces the complexity of a control system needed for a safety system.

As a result of another embodiment, a bigger distance can be bridged between a beam transmitter and a receiver.

Also of advantage is an embodiment in which a position for mounting a transmitter and receiver is guarded, permitting bending operations which overlap with an end region at already bent parts of the tool without impairing the safety function.

In other embodiments, the top tool is retained in the tool holder independent of the function of clamping the tool slats.

As a result of other possible embodiments, an exact displacement path needed for the clamping function of the tool slats is pre-defined.

In a further embodiment, a central position for a beam passage is achieved in the tool holder.

Another advantageous embodiment results in two exact switching positions and a switching procedure for the direction of movement of the press beam within a pre-defined tolerance limit.

However, another embodiment is also possible, whereby impairment of the beam passage due to deposits or dirt is largely avoided.

As a result of a further embodiment, a switching procedure between the two switch states is reliably guaranteed before an end position defined by the displacement path is reached.

Other advantageous embodiments are also described herein, which enable both possible end positions of the tool slats, in other words the lowered and the clamped positions, to be positively monitored so that the function of the safety system can be determined before a bending process, thereby satisfying the guidelines for safety class IV governing production systems of this type.

Another embodiment is possible, whereby the weight of a tool slat is significantly reduced, which means that the thickness of the tool slat and hence the length of the bending edge may be made longer for a pre-defined weight intended to avoid injuries, thereby reducing the number of tool slats needed for a predetermined total bending length.

Finally, another advantageous embodiment is described, whereby the laser beam is covered, which effectively avoids a potential source of disruption if the laser beam is inadvertently interrupted.

However, the objective is also achieved by the invention by means of a bending tool as described herein. The advantage of this is that, in addition to reducing weight caused by unclamped contact with a body part prior to reaching a "mute position"—safety distance between the bending tools moved relative to one another—economic use of materials and production costs are achieved.

In some embodiments, the bending tools can be adapted to the intended application with a view to optimizing strength, thereby resulting in inexpensive tools.

BRIEF DESCRIPTION OF THE DRAWINGS

In order to provide a clearer understanding of the invention, examples of embodiments will be described in more detail with reference to the appended drawings.

Of these.

DETAILED DESCRIPTION OF PREFERRED EMBODIMENTS

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

Figure 1:
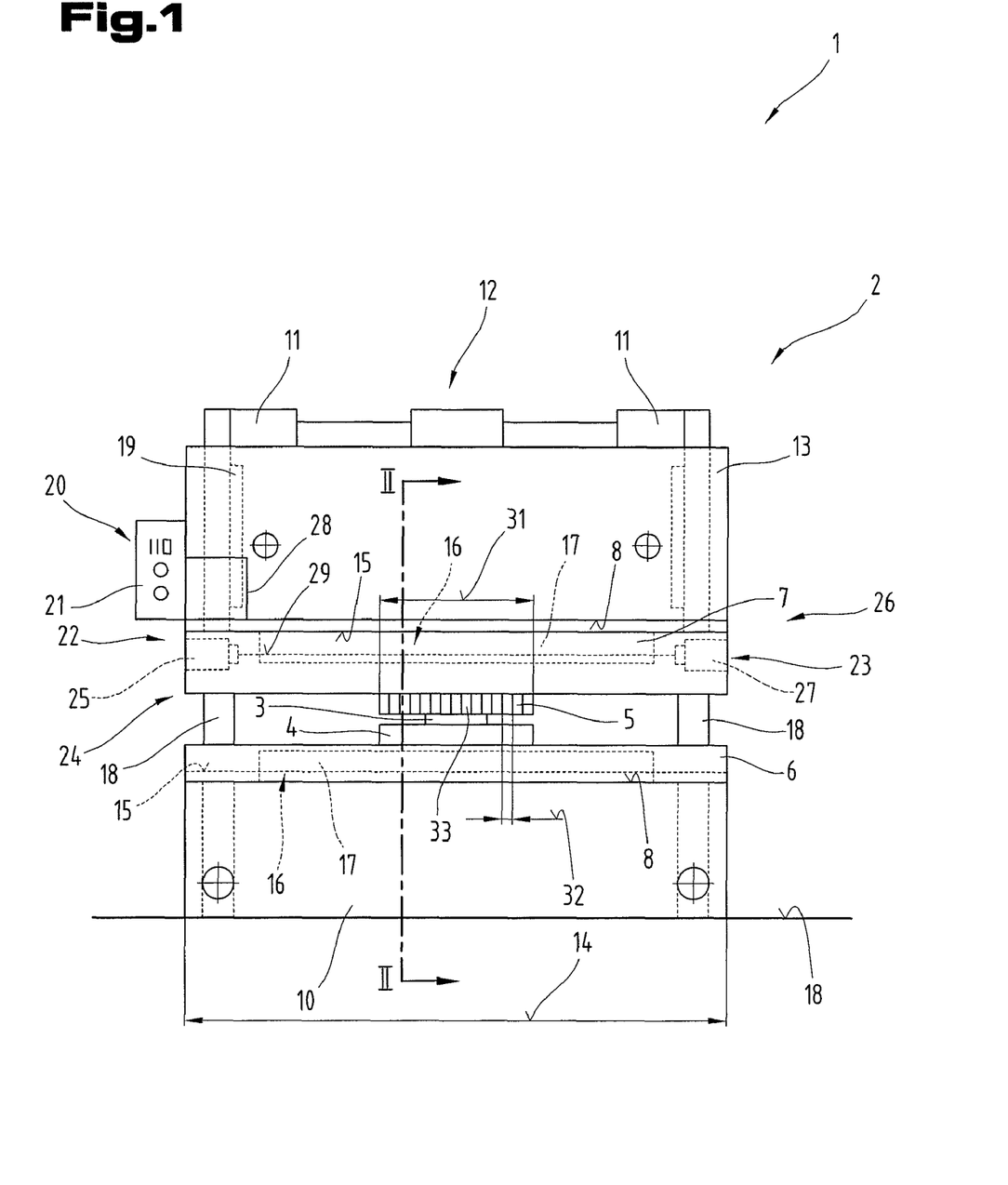
FIG. 1 is a front view of a production unit incorporating the safety system proposed by the invention.

FIG. 1 illustrates a production unit 1, in particular a bending press 2, for forming a bend on a sheet metal part 3 between a stationary, preferably bottom bending tool 4 and a top bending tool 5 which can be displaced relative to it. The bending tools 4, 5 are clamped in oppositely lying tool holders 6, 7 disposed at oppositely lying end faces 8, 9 of a stationary bench beam 10 and a press beam 13 which can be displaced by drives 11 of a drive system 12. The tool holders 6, 7 preferably extend across an entire length 14 of the bench beam 10 or press beam 13 and have a receiving groove 15 for the bending tools 4, 5 extending across the entire length 14, and each of the tool holders 6, 7 is provided with a mechanically or hydro-mechanically acting clamping mechanism 16.

The bench beam 10 is secured directly to end faces of C-shaped side stands 18 of the bending press 2 so that it can not move, whilst the displaceable press beam 13 is mounted so as to be displaceable in guide arrangements 19 extending perpendicular to a standing surface 18. The production unit 1 has a control system 20 with an input and output terminal 21.

A safety system 22 wired to the control system 20 is also provided, by means of which the working area directly between the bending tools 4 is monitored in order to prevent injuries to operating personnel in the event of incorrect operation of the production unit 1.

In the embodiment illustrated and described as an example, the safety system is integrated in the tool holder 7. Naturally, it could also be arranged somewhere else on the press beam 13 within the scope of the invention and there is no restriction in this respect.

The safety system 22 comprises a light beam transmitter and receiver system 23, preferably a laser system with at least one laser beam transmitter 25 disposed in one end region 24 in the receiving groove 15 of the tool holder 7 of the top bending tool 5 and a laser beam receiver 27 disposed in an opposite end region 26 lying opposite the laser beam transmitter 25 and an appropriate generator 28. This enables a light beam 29, in particular a laser beam, to be transmitted by the laser beam transmitter 25 to the laser beam receiver 27, which is used as a switching means for generating an on/off signal with an appropriate control function in the control system 20, and the switching states correspond to reception of the laser beam 29 in the laser beam receiver 27 during unobstructed transmission or no reception if transmission is interrupted.

In order to achieve this function, the top bending tool 4 disposed in the tool holder 7 is provided in the form of a slatted tool 30 in a manner known per se, in other words forms a required tool length 31 by means of a number of tool slats 33 constituting a thickness 32 of a tool slat 33. The thickness 32 of a tool slat 33 is preferably between 2.0 mm and 20.0 mm and the weight of the tool slat 33 can additionally be influenced depending on whether the tool slat 33 is a so-called solid slat or a skeleton slat. The weight is relevant to safety and should be between 80N and 250N, preferably 150N. This ensures that if the tool slat 33 loosely acts on a body part of the operator, e.g. a finger, there is no risk of crushing.

Figure 2:
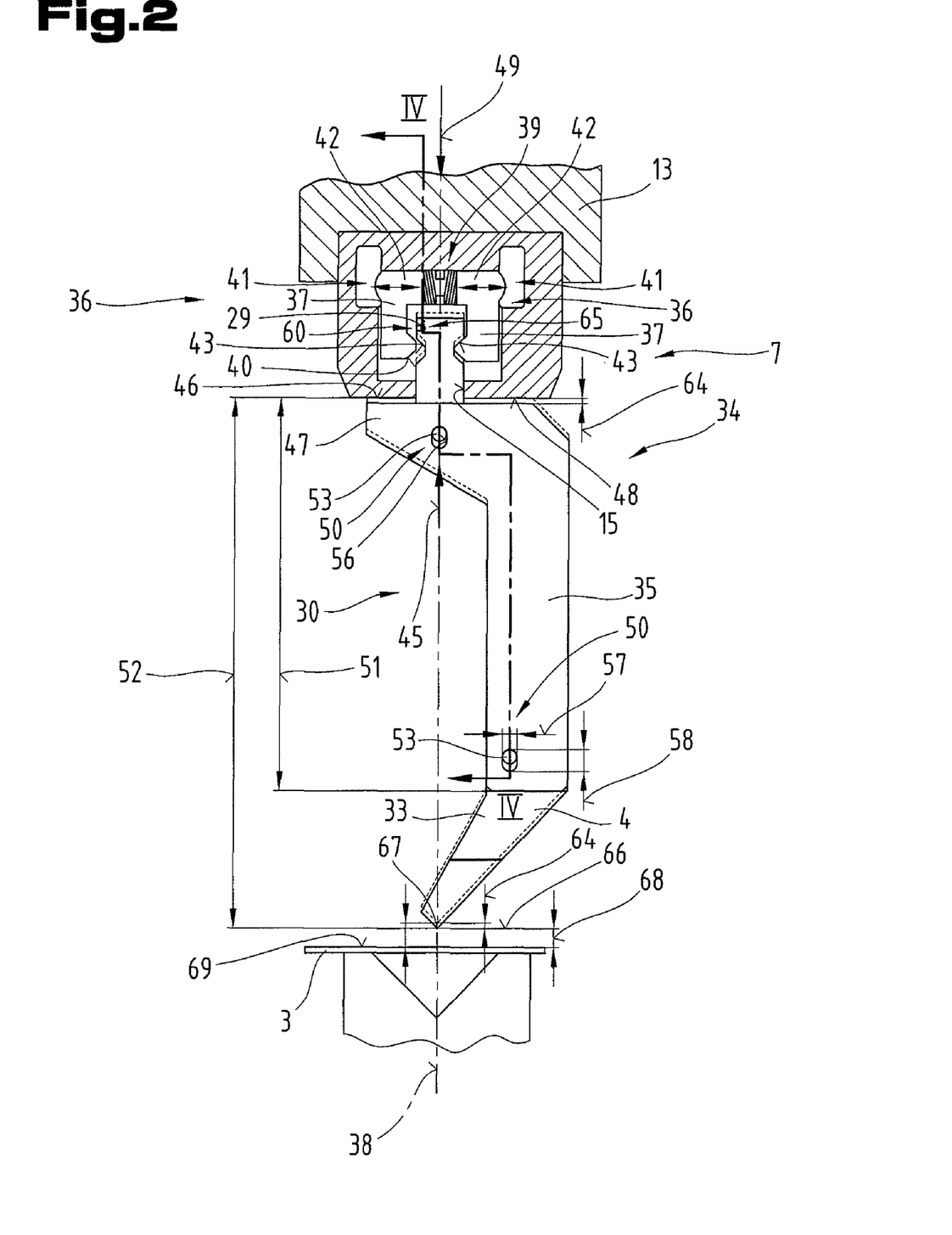
FIG. 2 shows the safety system on a tool holder fitted with a top tool, viewed in section along line II-II indicated in FIG. 1.
Figure 3:
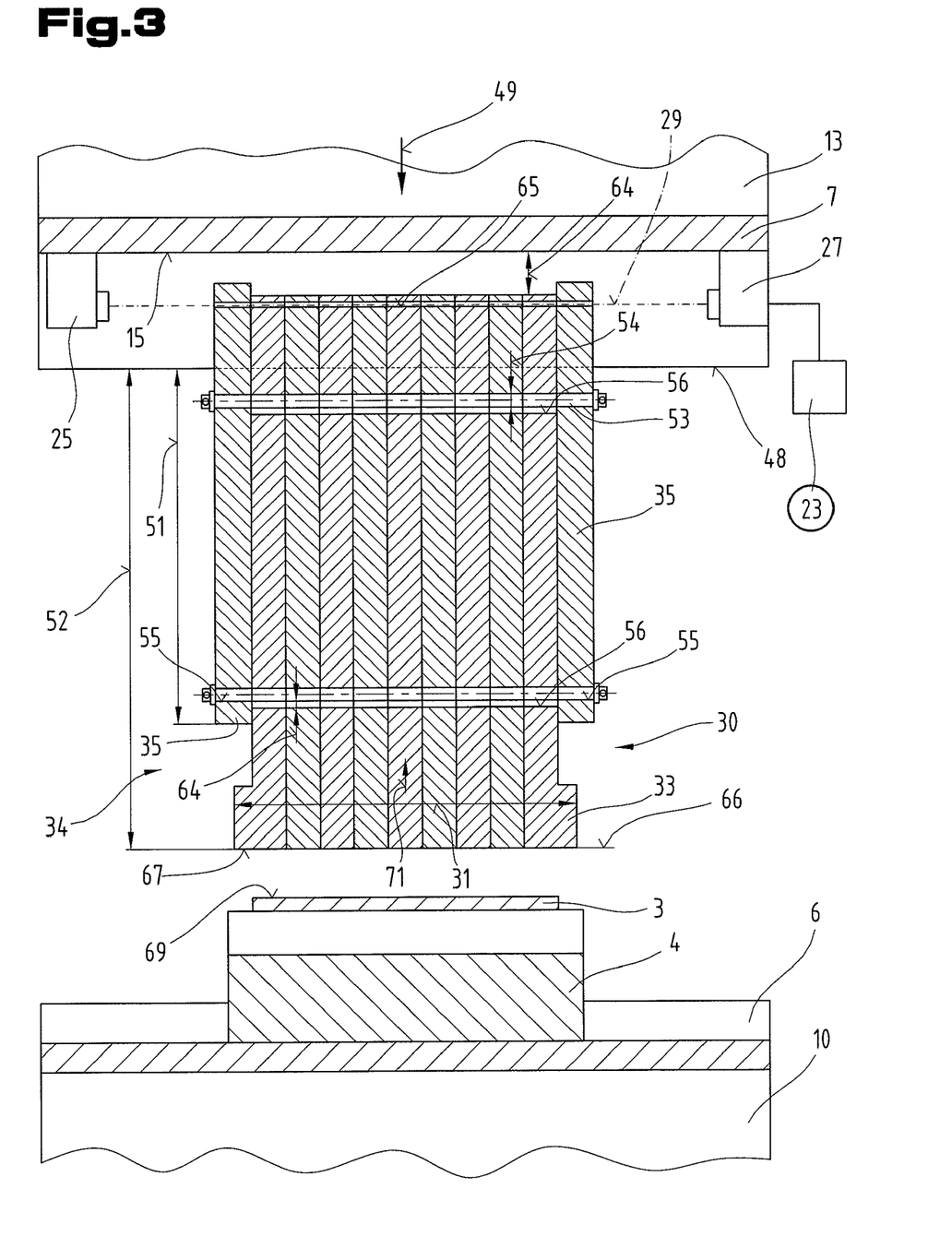
FIG. 3 shows the safety system proposed by the invention, viewed in section along line III-III indicated in FIG. 2.
Figure 4:
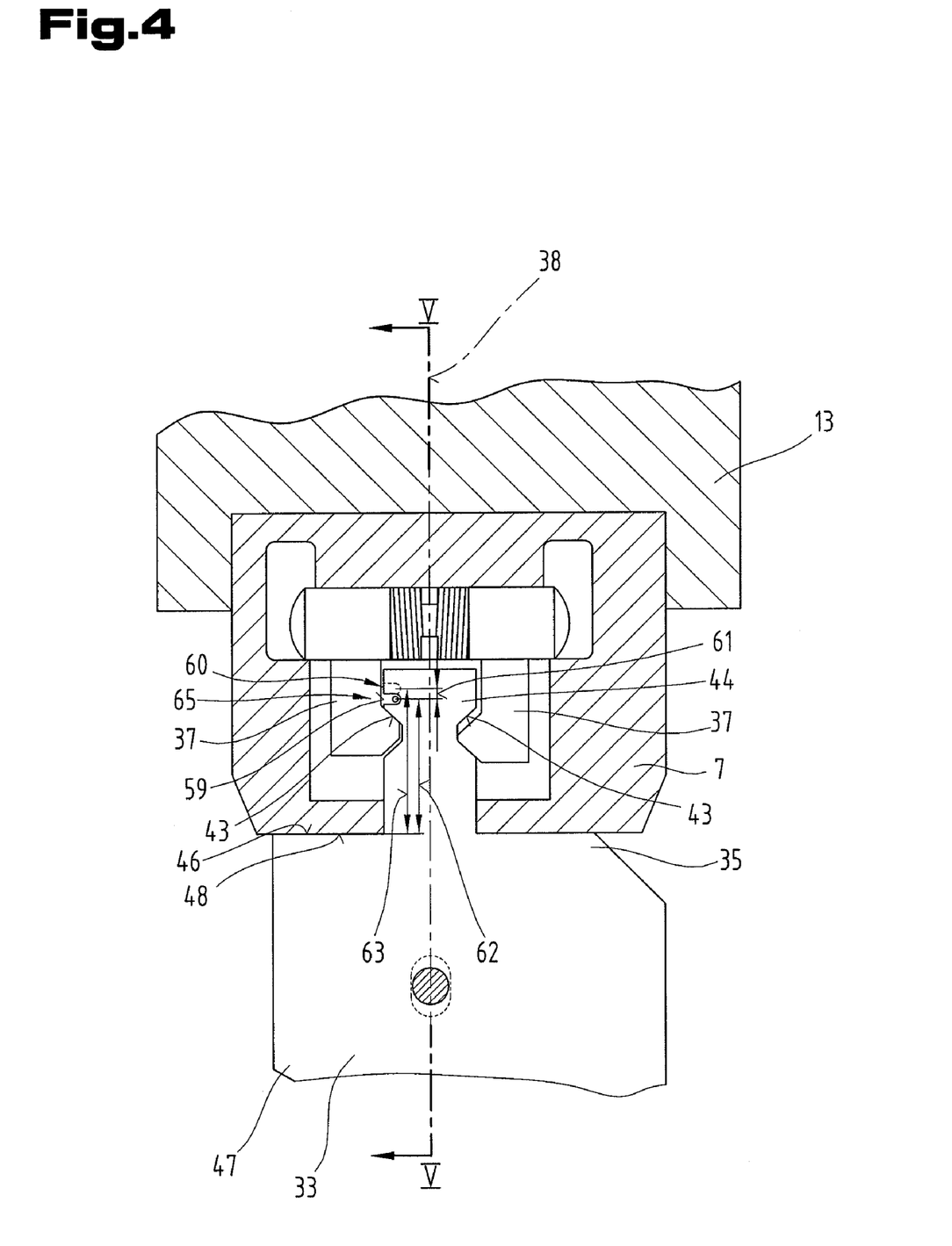
FIG. 4 shows a detail of the tool holder with clamped tool and reference slats, viewed in section along line IV-IV indicated in FIG. 5.

FIGS. 2 to 4 illustrate the bending tool 4 in detail, specifically a slat pack 34 comprising a number of tool slats 33 and reference slats 35 at either end, inserted in the receiving groove 15 of the tool holder 7 of the press beam 13.

The tool holder 7 is provided with two clamping mechanisms 36 which can be operated independently of one another, preferably hydro-mechanically. Clamping elements 37 of the clamping mechanisms 36 can be displaced by reference to a mid-axis 38 of the tool holder 7 symmetrically opposite and in the direction extending perpendicular to the mid-axis 38 opposing the action of a spring arrangement 39 disposed between them, with clamping jaws 40 projecting into the receiving groove 15 in order to clamp the bending tool 4, due to the application of pressure with a pressurizing medium. Pressure chambers 41 are provided in the tool holder 7, extending in the direction of the length 14. The clamping elements 37 have pressure pistons 42 projecting into the pressure chambers 41. When the relevant pressure chamber 41 is paced under pressure by pressurized medium, the clamping elements 37 of the relevant clamping mechanism 36 are moved against the action of the spring arrangement 39 in the direction of the mid-axis 38, as a result of which the clamping jaws 40 are moved and engaged in clamping grooves 43 of clamping projections of the tool slats 33 projecting into the receiving groove 15. Due to the geometry of the clamping jaws 40 and the disposition of the clamping grooves 43 of the clamping lugs 44, the tool slats 33 and the reference slats 35 are raised—as indicated by arrow 45—and are pressed by means of bearing surfaces 46 of tool shoulders 47 in a plane extending perpendicular to the mid-axis 38 against support surfaces 48 of the tool holder so that the tool slats 33 are in an operating position ready for a bending operation on the sheet metal part 3 when the press beam 13 is displaced—as indicated by arrow 49. As may also be seen from the detailed illustrations of FIGS. 2 to 4, the slat pack 34 of the embodiment illustrated as an example is provided with two reference slats 35 which accommodate the tool slats 33 between them. These are provided with the standard clamping lugs 44 but are not designed as bending tools, i.e. these reference slats 35 project by only a partial height 51 of a total height 52 of the tool slats 33 along the support surface 48 of the tool holder 7 in the direction of the stationary bending tool 4 in the tool holder 6 of the bench beam 10.

The top tool 30 formed by the two reference slats 35 and the tool slats disposed in between are assembled to form a tool unit by means of a linear guide unit 50, preferably formed by two guide rods 53 traversing the entire unit in the direction of the tool length 31, for which purpose the reference slats 35 are provided with bores 55 with a diameter 54 matching that of the guide rods 53. The guide rods 53 extend through the tool slats 33 in slots 56 with a width 57 approximately corresponding to the diameter 54 and a length 58 which is approximately twice the diameter 54, the slots being oriented in the vertical direction., i.e. corresponding to the displacement direction—as indicated by arrow 49—of the press beam 13. As a result of this linear guide unit 50, the tool slats 33 are displaced relative to the reference slats 35.

Since the clamping mechanisms 36 can be operated independently of one another, it is now possible to fix the slat pack 34 in the tool holder in a suspended arrangement by clamping the reference slats 35 with one of the clamping mechanisms 36, causing the reference slats 35 to be pressed by the tool shoulders 47 or their bearing surfaces 46 against the support surfaces 48 of the tool holder 7. The other clamping mechanism 36 used to clamp the tool slats 33 is not operated until immediately before a bending process. In the non-clamped state, the fact that it is possible to displace the reference slats 35 relative to the tool slats 33 in the guide unit 50 means that the tool slats 33 can be moved into a lowered position relative to the reference slats 35 due to force of gravity, as may be seen from FIGS. 2 and 3.

Groove-shaped recesses 60 are provided in the clamping projections 44 of the reference slats 35 and the tool slats 33, traversing them through side faces 59 in the direction of the thickness 32, and the recesses 60 of the reference slats 35 have a height offset 61 from the recesses 60 of the tool slats 33. This being the case, a distance 62 of the recess 60 of the reference slat 35 from the bearing surface 46 of the tool shoulder 47 is shorter than a distance 63 of the recess 60 of the tool slat 33 from the bearing surface 46 of the tool shoulder 47.

As may be seen in particular from FIG. 2, the top tool 30 is secured in the receiving groove 15 due to a positive connection of the clamping elements 37 with the clamping grooves 43 of the reference slats 35 so that they can not fall out of the tool holder 7. The other, independent clamping mechanism 35, which co-operates with the clamping grooves 43 of the tool slats 33, does not engage with the clamping grooves 43 of the tool slats 33 in the non-clamped state, i.e. the clamping jaws 40 of this clamping mechanism 36 are disengaged from the clamping grooves 43 of the tool slats 33. As a result, the tool slats 33 are disposed in a lowered position relative to the master slats 50 due to the slots 56—as indicated by solid lines. Before initiating a bending operation on the sheet metal part 3, the tool slats 33 are now clamped by establishing the positive connection between the clamping jaws 40 of the clamping mechanism 36 and the clamping grooves 40 of the tool slats 33, as a result of which they are also raised so that the bearing surface 46 moves into abutment with the support surface 48—as indicated by broken lines. A displacement path 64 is slightly longer than the height offset 61, the effect of which is that when the tool slats 33 are in the non-clamped state, the recesses 60 of the tool slats 33 assume a height position flush with the recesses 60 of the master slats 50 and thus form an uninterrupted beam passage 65 for the laser beam 29 emitted by the laser beam transmitter 25, which is therefore received by the laser beam receiver 27 disposed in the oppositely lying receiving groove 15. Accordingly, the displacement movement of the press beam 13—indicated by arrow 49—is released in the control system 20 and the displacement is effected by means of the drives 11, and a final clamping of the tool slats 33 by means of the clamping mechanism 36 does not take place until a so-called mute position 66 of a bending edge 67 is reached, in which a distance 68 of the bending edge 67 from a workpiece surface 69 is shorter than approximately 8 to 12 mm. This ensures that no body part, e.g. finger, of an operator can get into the region which might pose a risk to him. Although reception of the laser beam 29 at the laser beam receiver 15 is interrupted due to the clamping of the tool slats 33, the control system operates such that when the mute position 66 is reached, the downward movement is continued in order to run the bending operation. Once the press beam 13 has been moved upwards, in order to undertake another bending operation and activate the safety system 22, the original state with the tool slats 33 unclamped is resumed, so that the uninterrupted beam passage 65 is restored again due to the aligned position of the recesses 60.

Figure 5:
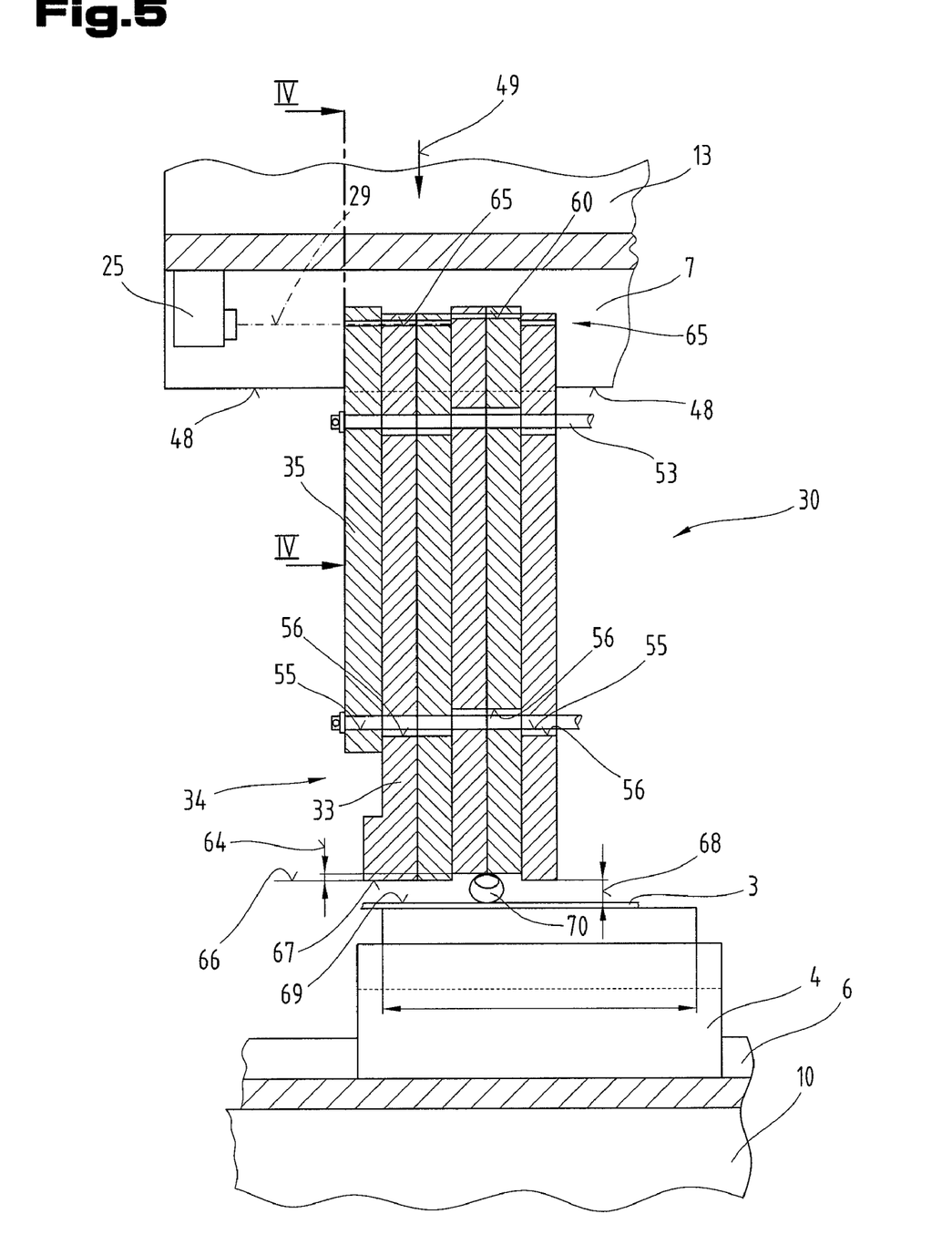
FIG. 5 shows the slat pack of the safety system proposed by the invention on impact with a body part, viewed in section along line V-V indicated in FIG. 4.

FIGS. 4 and 5 illustrate the situation which prevails when, before reaching the mute position 66, for example, a finger 70 moves between the bending edge 67 and the workpiece surface 69 as the press beam is moved downwards—arrow 49.

In this situation, the tool slats 33 overlapping the region of the finger 70 are displaced relative to adjacent tool slats 33 but opposite the displacement direction of the press beam relative to the reference slat 35, as may be seen from arrow 71, and the beam passage 65 is therefore interrupted. In the control system 30, this causes an emergency-stop routine and reverses the drives 11 so that the press beam 13 is moved upwards.

However, due to the design of the safety system 22 proposed by the invention, it is also possible to control the function of the relative movement of the tool slats 33 prior to initiating the downward movement of the press beam 13, for example by clamping and then immediately unclamping the tool slats 33 in the top end position of the press beam 13. If, after the unclamping routine, the uninterrupted beam passage 65 is not restored due to the tool slats 33 assuming the suspended position and there is therefore no light beam passage, it will not be possible to move the press beam downwards and this state will be indicated by an error message, for example.

As mentioned above, in order to prevent injuries, the individual weight of the tool slat 33 resulting from the mass of the tool slat 33 should be approximately between 80N and 250N, preferably 150N. This limitation is achieved on the one hand by selecting the thickness 32 as a function of the total surface of the tool slat 33, in which case bigger thickness will be possible if skeleton tools 71, optimised for strength purposes, are used, such as a tool slat 33 of the type illustrated in FIG. 6. By using skeleton tools 71 of this type, the number of tool slats 33 used for a defined length 31 tool slats 33 can be significantly reduced due to the option of selecting a bigger thickness 32, thereby making the process of fitting tool sets easier.

Figure 6:
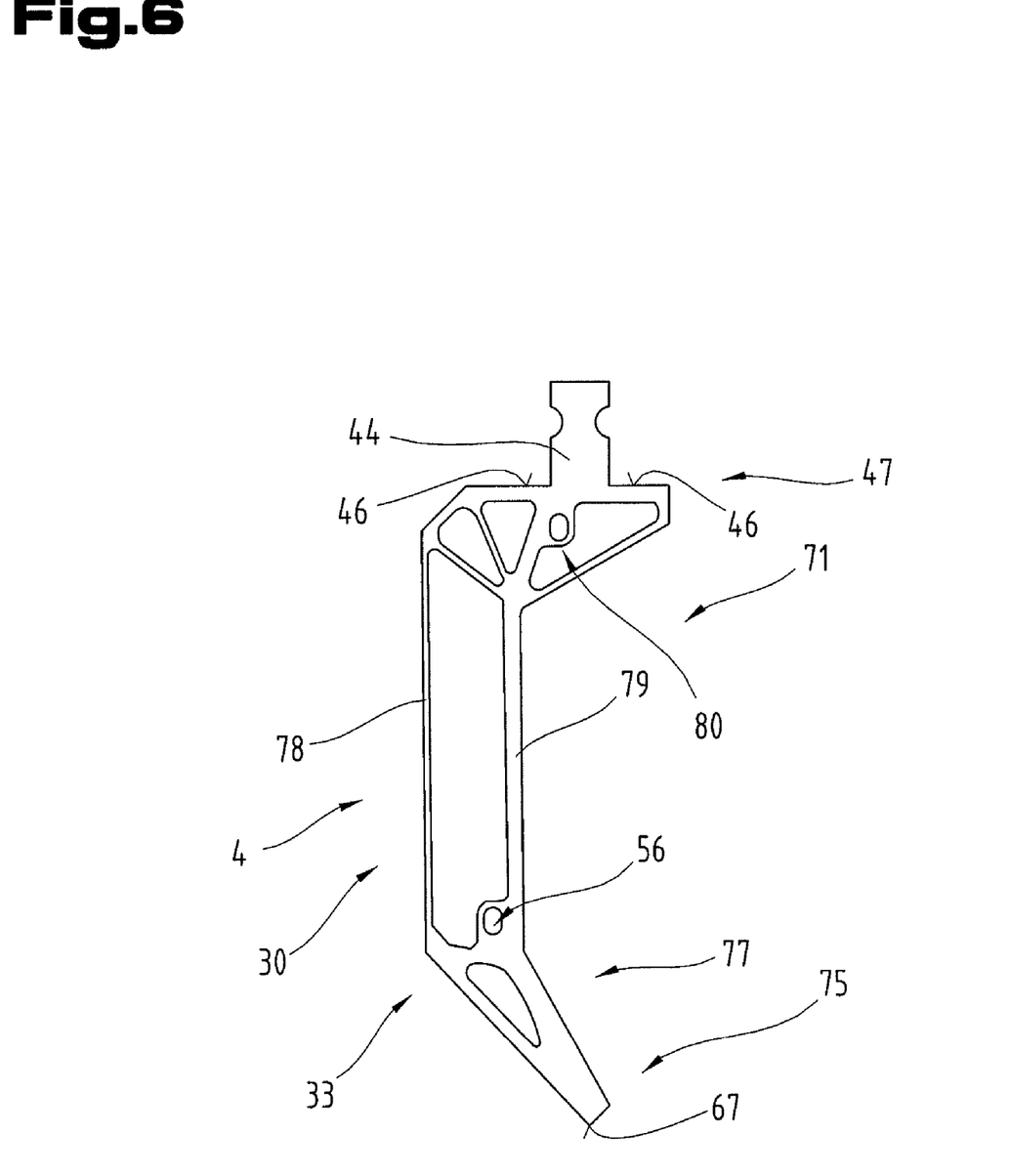
FIG. 6 is a front view of a skeleton tool.

As may be seen from FIG. 6, a skeleton tool 71 of this type comprises the clamping projection 44 for clamping in the tool holder 7 and a punch projection 75 forming the bending edge 67, for example. The latter has a web rib 76 forming the tool shoulders 47 with the bearing surfaces 46 and the web rib 77 forming the bending edge 67. These are connected by means of a tension bar 78 and a pressure bar 79 extending substantially parallel, for example. It is also possible to provide guide means 80, for example the slots 56, which permit the relative displacement so that the skeleton tool 71 can be used with the safety system—as described in the previous examples.

A surface proportion of the web ribs 76, 77 and tension and pressure bars 78, 79 is preferably between 5% and 30% of a total surface defined by the external contour of the punch projection 75.

It should also be mentioned that such tool slats 33 can be produced particularly economically in terms of material and production process by using sheet metal cuttings. A high production accuracy can be achieved in particular using laser cutting techniques, which obviates the need for finishing work in many cases and avoids cost- and material-intensive production methods involving the removal of material.

The embodiments illustrated as examples represent possible design variants of the safety system 22 and it should be pointed out at this stage that the invention is not specifically limited to the design variants specifically illustrated, and instead the individual design variants may be used in different combinations with one another and these possible variations lie within the reach of the person skilled in this technical field given the disclosed technical teaching. Accordingly, all conceivable design variants which can be obtained by combining individual details of the design variants described and illustrated are possible and fall within the scope of the invention.

For the sake of good order, finally, it should be pointed out that, in order to provide a clearer understanding of the structure of the safety system, it and its constituent parts are illustrated to a certain extent out of scale and/or on an enlarged scale and/or on a reduced scale.

The objective underlying the independent inventive solutions may be found in the description.

The invention claimed is:

1. Safety system for a bending press with a stationary bench beam and a press beam which can be linearly displaced in a guide arrangement relative to the bench beam by means of a drive system, and with bending tools in tool holders disposed at oppositely lying end faces of the bench beam and of the press beam forming an operation area between mutually facing forming regions, the safety system comprising:
   a light beam transmitter and a light beam receiver monitoring the operating region to prevent trapping of a foreign body;
   wherein the bending tool disposed in the press beam comprises a plurality of slats adjacently arranged with respect to one another such that the slats collectively form the bending tool, said slats including at least one reference slat and at least one tool slat which can be displaced relative to the reference slat;
   each of the slats having a recess therein, the recesses of the slats when aligned with one another forming a beam passage through the bending tool for passage of a light beam between the light beam transmitter and the light beam receiver, the light beam extending parallel with the end face of the press beam, misalignment of one or more tool slats relative to the reference slat causing the misaligned tool slat(s) to block the light beam.

2. Safety system according to claim 1, wherein the light beam transmitter is operable to produce a laser light beam.

3. Safety system according to claim 1, wherein at least one laser beam transmitter and one laser beam receiver is disposed respectively in a groove of the tool holder and/or on the press beam in regions lying opposite one another.

4. Safety system according to claim 1, wherein at least the tool holder for the bending tool of the press beam has two clamping mechanisms which can be operated independently of one another for clamping the slats.

5. Safety system according to claim 4, wherein the clamping mechanisms are provided in the form of hydro-mechanical clamping sets.

6. Safety system according to claim 4, wherein the slats include clamping projections for being clamped by the clamping mechanisms, and wherein the recesses forming the beam passage comprise recesses in side faces of the clamping projections.

7. Safety system according to claim 6, wherein the recesses in the clamping projections of the reference slat and the tool slat are respectively disposed on oppositely lying end faces.

8. Safety system according to claim 4, wherein the slats include clamping projections for being clamped by the clamping mechanisms, and wherein the recesses are formed by orifices in the clamping projections.

9. Safety system according to claim 1, wherein the tool slat and the reference slat are clamped in the tool holder separately from one another.

10. Safety system according to claim 1, wherein the tool slat and the reference slat are disposed adjacent to one another and are displaceable relative to one another in a linear guide in the displacement direction of the press beam.

11. Safety system according to claim 10, wherein the linear guide is provided in the form of two guide rods traversing the slats in the direction of a tool length.

12. Safety system according to claim 11, wherein bores are provided in the reference slat as a means of accommodating the guide rods.

13. Safety system according to claim 12, wherein the bores in the reference slat correspond to a diameter of the guide rod.

14. Safety system according to claim 11, wherein slots are provided in the tool slats extending in the displacement direction of the press beam for accommodating the guide rods.

15. Safety system according to claim 14, wherein a width of the slot corresponds to the diameter of the guide rod.

16. Safety system according to claim 14, wherein a length of the slot approximately corresponds to the displacement path in the displacement direction of the press beam between the reference slat and the tool slat.

17. Safety system according to claim 1, wherein a displacement path between the tool slat and the reference slat approximately corresponds to a trailing path of the press beam.

18. Safety system according to claim 1, wherein the tool holder that holds the slats defines a support surface and each of the slats defines a tool shoulder having a bearing surface for engaging the support surface of the tool holder, and wherein a distance between the recess in the reference slat and the bearing surface of the reference slat is shorter than a distance between the recess in the tool slat and the bearing surface of the tool slat by an amount equal to a displacement distance by which the tool slat is displaceable relative to the reference slat.

19. Safety system according to claim 1, wherein a height of the recesses is the same as or shorter than a distance by which the tool slat is displaceable relative to the reference slat.

20. Safety system according to claim 1, wherein on either side of the slats or at end regions of the press beam, respectively two laser beam transmitters and two laser beam receivers lie opposite one another in an aligned arrangement and the slats have recesses defining two separate beam passages.

21. Safety system according to claim 1, wherein the tool slats are provided in the form of skeleton slats.

22. Safety system according to claim 1, wherein screening elements for the light beam are provided in a receiving groove between the light beam transmitter and the slats and/or between the slats and the light beam receiver.

* * * * *